United States Patent
Van Brug et al.

(10) Patent No.: US 12,209,958 B2
(45) Date of Patent: Jan. 28, 2025

(54) INTERFEROMETRIC GAS SENSOR

(71) Applicant: Nederlandse Organisatie voor toegepast-natuurwetenschappelijk onderzoek TNO, 's-Gravenhage (NL)

(72) Inventors: Hedser Van Brug, The Hague (NL); Huibert Visser, Rotterdam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 201 days.

(21) Appl. No.: 17/918,691

(22) PCT Filed: Apr. 30, 2021

(86) PCT No.: PCT/NL2021/050283
§ 371 (c)(1),
(2) Date: Oct. 13, 2022

(87) PCT Pub. No.: WO2021/221507
PCT Pub. Date: Nov. 4, 2021

(65) Prior Publication Data
US 2023/0349824 A1    Nov. 2, 2023

(30) Foreign Application Priority Data

Apr. 30, 2020  (EP) .................................... 20172459

(51) Int. Cl.
*G02B 5/30* (2006.01)
*G01N 21/17* (2006.01)
(Continued)

(52) U.S. Cl.
CPC .......... *G01N 21/45* (2013.01); *G02B 5/3083* (2013.01); *G01N 2021/1795* (2013.01);
(Continued)

(58) Field of Classification Search
CPC .............. G01J 3/45; G01N 2021/1795; G01N 2021/3531; G01N 2021/418;
(Continued)

(56) References Cited

U.S. PATENT DOCUMENTS

| 5,774,215 A | 6/1998 | Padgett et al. |
| 2002/0037126 A1* | 3/2002 | Martinelli ............ G02B 6/2746 385/11 |

(Continued)

FOREIGN PATENT DOCUMENTS

| CN | 103528688 A | 1/2014 |
| WO | WO 2016/076724 A2 | 5/2016 |

(Continued)

OTHER PUBLICATIONS

European Patent Office, International Search Report in corresponding International Application No. PCT/NL2021/050283, dated Jul. 29, 2021 (5 pages).

*Primary Examiner* — Hina F Ayub
(74) *Attorney, Agent, or Firm* — Leydig, Voit & Mayer, Ltd.

(57) ABSTRACT

A detector system for spatially resolved detection of a gas substance in an area is described. The detector system includes a detector comprising an image sensor; a band filter arranged in an optical beam path before the detector for transferring a beam with a wavelength spectrum including an absorption wavelength corresponding to the gas substance, a telescope, a polarizing beam splitter, and an interferometric stage including a retarder for creating an optical path difference for measuring absorption dips due to the presence of the gas substance. The retarder includes multiple birefringent media arranged with the optical axes relative to each other so that at least one increases an optical path difference and at least one decreases an optical path difference between the polarized beam components, and the (Continued)

thicknesses of the birefringent media are tuned to minimize a focal shift between the polarized beam components.

8 Claims, 3 Drawing Sheets

(51) Int. Cl.
    *G01N 21/41*     (2006.01)
    *G01N 21/45*     (2006.01)
    *G02B 13/22*     (2006.01)
    *G02B 23/04*     (2006.01)

(52) U.S. Cl.
    CPC . *G01N 2021/418* (2013.01); *G01N 2021/451* (2013.01); *G02B 13/22* (2013.01); *G02B 23/04* (2013.01)

(58) Field of Classification Search
    CPC ......... G01N 2021/451; G01N 21/3504; G01N 21/45; G01N 2201/0214; G02B 13/22; G02B 23/04; G02B 5/3083
    See application file for complete search history.

(56) References Cited

U.S. PATENT DOCUMENTS

| | | | | |
|---|---|---|---|---|
| 2007/0034803 A1* | 2/2007 | Plant | ................... | G02B 27/283 |
| | | | | 250/341.8 |
| 2022/0205906 A1* | 6/2022 | Martin | ............... | G01N 33/4972 |

FOREIGN PATENT DOCUMENTS

| | | |
|---|---|---|
| WO | WO 2018/029615 A1 | 2/2018 |
| WO | WO 2019/212354 A1 | 11/2019 |

\* cited by examiner

INTERFEROMETRIC GAS SENSOR

CROSS-REFERENCE TO RELATED APPLICATIONS

This patent application is a U.S. National Phase of PCT International Application No. PCT/NL2021/050283, filed Apr. 30, 2021, which claims priority to European Application No. 20172459.8, filed Apr. 30, 2020, which are both expressly incorporated by reference in their entireties, including any references contained therein.

FIELD OF THE INVENTION

The invention relates to a method and system for spatially resolved interferometric gas detection, in particular in a satellite application that orbits the planet.

BACKGROUND OF THE INVENTION

In the past years, gas detection system were developed based on optical interferometry in particularly of spatially resolved detection of a gas substance in an area. Such a gas detection system can be used on a satellite to detect gases in the atmosphere in a specific area and are described in patent applications WO2016076724, WO2016159766, and WO2018117835. It generally makes use of the well known Mach-Zehnder or Michelson interferometer configuration.

The interferometer makes use of a phase retarder to create a phase difference between two orthogonal polarisation components (OPD—optical path difference). Subsequently, a polarizing beam splitter is used to split the light into two beams that travel in different optical paths.

WO2016076724 describes a configuration wherein a retarder is inserted before the polarization splitter to create the optical path difference (OPD). In a practical embodiment described in this application, a polarizing beam splitter cube (PBC) comprises a quarter wave plate (QWP) inserted under an angle e.g. 45°. This way the two polarization states will receive equal amount of light. The detection system can be created for all wavelength ranges of interest, provided that the polarization effects in the optical components can be kept within an acceptable range, with a telescope of a refractive type to preserve the polarization states.

WO2016159766 describes configurations wherein further splitters are used to create multiple output beams. The retarder ($\lambda/2$) is inserted before the polarization splitter.

WO2018117835 describes an interferometer system, wherein an adjustable light transmitting structure is located in one or both of the optical paths (i.e. the two optical paths created by the splitter). The structures are typically made of glass, e.g. optical glass or Schott glass. These structures help in setting-up, calibrating and/or maintaining the system's Optical Path Difference (OPD) configuration.

WO2019212354 is a recent patent application, wherein a retarder is used that comprises one or more birefringent elements. As a result, two polarised components of the same beam of the received radiation travel along essentially the same trajectory with a path length difference. The radiation output from the one or more retarders is subsequently filtered for respective polarisation states by a polariser, and the radiation going through the polariser is detected.

A disadvantage of the prior art system especially WO2019212354 is that a significant amount of radiation is lost due to the polariser. Only the radiation from one polarisation state can pass through the polariser, the remainder of radiation is lost. For many applications, this is not a problem. However, this is a problem for space applications, because the amounts of radiation that need to be detected can be very small.

A gas detection system can be created for all wavelength ranges of interest, provided that the polarization effects in the optical components can be kept within an acceptable range, with a telescope of a refractive type to preserve the polarization states. A required optical path difference OPD for measuring absorption dips due to the presence of a gas of interest is found using the formula that gives the coherence length of the multispectral light, i.e.

$$OPD = \frac{\lambda^2}{\Delta\lambda}$$

Here $\lambda$ equals a central wavelength of a band filter where the absorption dips occur and $\Delta\lambda$ equals the spectral separation of the absorption peaks. The band filter limits the spectral range to the part of the spectrum where the absorption features are present.

A retarder in an interferometer will typically, in addition to generating a phase delay, induce a focus error between the two interferometer branches. This error can be expressed by $$\frac{L1}{n_1} - \frac{L2}{n_2}$$

where L1 and L2 are the path lengths traveling through optical media N1, N2 of branches 1 and 2 respectively.

The retarder creates a phase difference between two orthogonally polarization components that is wavelength dependent. This finally leads to fringes (throughput changing with wavelength) when measured through a polarization filter.

A retarder will typically not be manufactured with a sufficient high precision in thickness to completely design an optical system to correct for such focus errors while maintaining flexibility for a chosen optical path difference. The invention is directed to solve the above problem.

SUMMARY OF THE INVENTION

The invention aims to overcome these problems by a detector system for spatially resolved detection of a gas substance in an area comprising at least one detector comprising an image sensor; a band filter arranged in the optical beam path before the detector; for transferring a beam with a wavelength spectrum including an absorption wavelength corresponding to said gas substance. The detector system comprises a telescope, a polarizing beam splitter; and at least one interferometric stage comprising a retarder for creating a phase difference. The telescope is arranged to imaging the area onto the at least one detector; wherein the polarizing beam splitter is arranged to produce polarized beams of said broad band beam of mutual orthogonal polarization in respective branches. At least one detector is provided in at least one of the branches. At least one interferometric stage is arranged to receiving one of said polarized beams to produce an interferometric image on said at least one detector. The retarder comprises multiple birefringent media having mutually different materials and each having optical axes that are not aligned with the polarized beam in order to create polarized beam components traveling along the respective optical axes of the birefringent media having a mutual path difference; said multiple birefringent media arranged with the optical axes relative to each other so that at least one increases an optical path difference and at least one decreases an optical path difference between the polarized beam components to minimize a focal shift between the polarized beam components. Specifically, for a given selection of birefringent media, the thicknesses of said media are selected to obtain a required optical path difference for the gas substance to be detected while a focal shift is minimized, ideally to zero. Additional to the advantage of a minimized focal shift this new type of retarder provides an interferometer with reduced angular dependency of the OPD value.

DETAILED DESCRIPTION OF EMBODIMENTS

Figure 1:
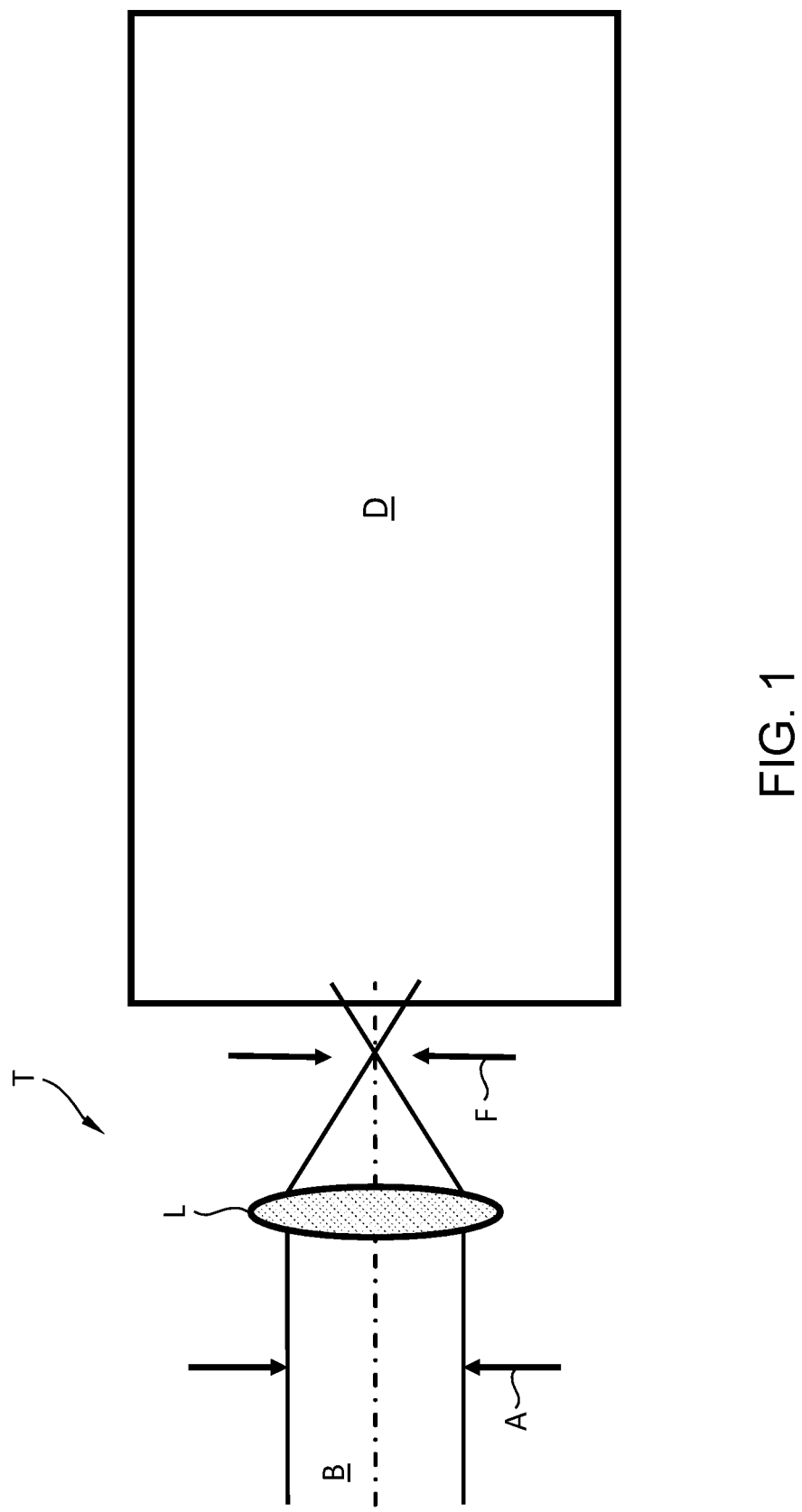
FIG. 1 schematically shows an embodiment having a detector system provided in a satellite application.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. Throughout the application, any means for carrying out the disclosed methods, in particular, as further clarified below: means imaging, means for splitting, means for relaying can be implemented by optics that are known to the skilled person and may differ in form and structure to arrive at the same function; i.e. the function is physically implemented in optical elements such as mirrors, lenses and prisms. Furthermore, the identified controller functions may be implemented in hardware or software, to provide dedicated processing circuitry that processes input data read from system resources. A server function may e.g. be provided by a connected physical network device, but may also be formed as a virtual device, functioning in a network, and which may be implemented on a hardware resource that can be reached via network communication. These functions may be executed by one or more processors configured to perform operational acts in accordance with the present systems and methods, such as to provide control signals to the various other module components. The controller may comprise a processor that may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Any type of processor may be used such as dedicated or shared one. The processor may include micro-controllers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods. The invention is described more fully hereinafter with reference to the accompanying drawings, in which embodiments of the invention are shown. This invention may, however, be embodied in many different forms and should not be construed as limited to the embodiments set forth herein.

Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the size and relative sizes of systems, components, layers, and regions may be exaggerated for clarity. Embodiments are described with reference to schematic illustrations of possibly idealized and/or intermediate structures of the invention.

In FIG. 1, schematically, a telescope system T is shown, e.g. for use in space applications, having a detector setup D as disclosed herein. The telescope T may be of a conventional setup, e.g. including an aperture A, lens L and field stop F, and is preferably of a telecentric type imaging incoming beam B from earth in a field stop F.

Figure 2:
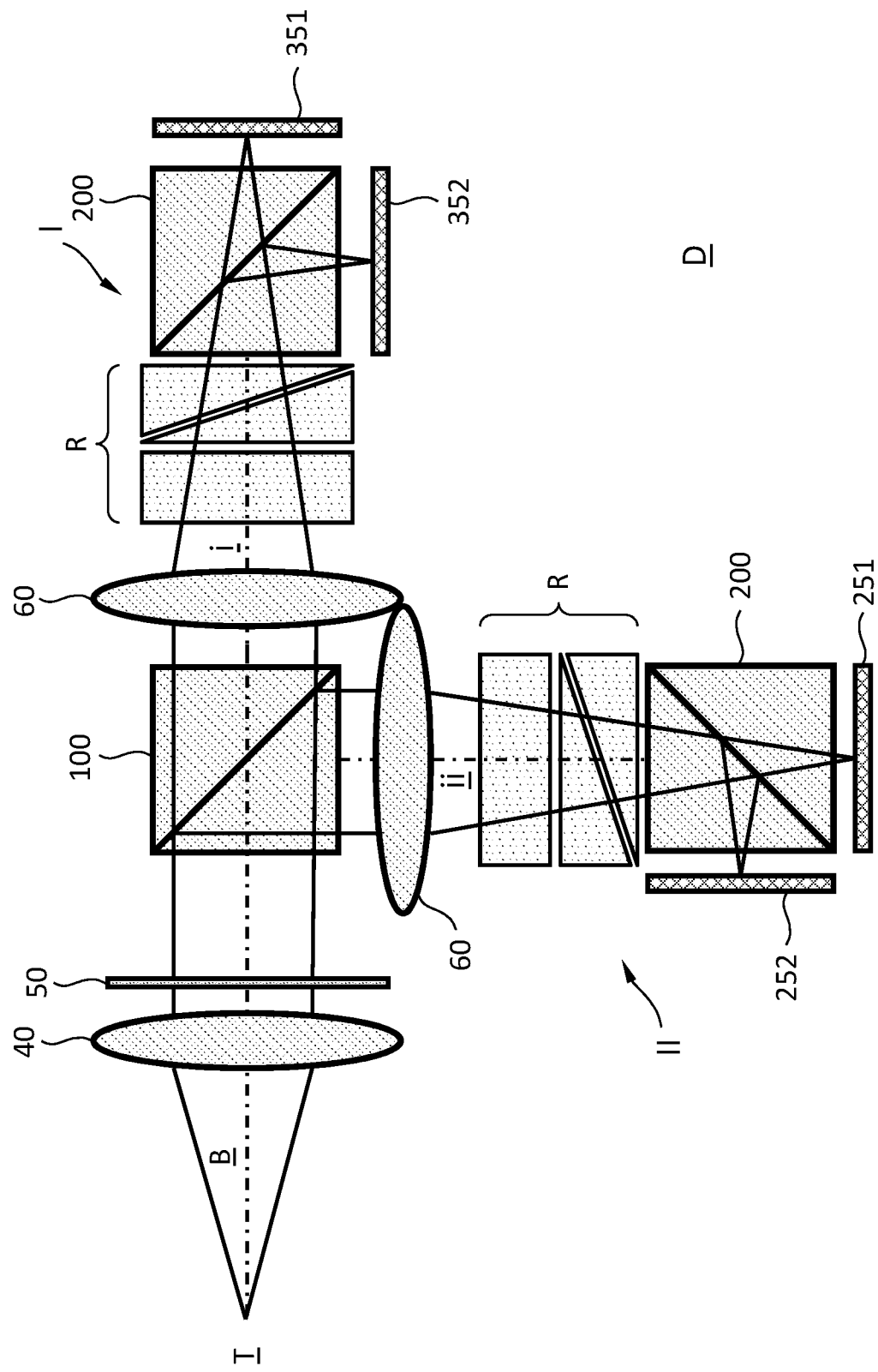
FIG. 2 shows a schematic detector design with an interferometer stage according to the invention.

In FIG. 2 a detector design D is shown wherein incoming light beam B imaged in field stop is imaged by relay lenses 40, 60 onto detectors 251, 252, 351, 352 for wavelength of interest; transmitted by band filter 50. The band filter may be tunable, but in the present example is set to a fixed spectral range. Although in the example here all exit ports of the interferometer branches I, II are provided with detectors, the invention already works for a single detector collecting two exit port by using some additional optics. As will be disclosed herein, interferometer branches I, and II produce interferometer images on the detectors 351, 352 and 251, 252 respectively of pi stepped images in respective branches i, ii. Preferably the detector values of 251 and 351 are combined into a single image, essentially collecting the same phase—e.g. of an on-peak value; as can be the detector values of detectors 152 and 252 of an off peak value of the peaked absorption spectrum relayed through the detector system D. For this approach an angular independent Optical Path Difference (OPD) is created such that a spectral fringe pattern is created that analyses the concentration of the gas being detected, of the incoming beam B of an area of interest To this end incoming beam B is split into two interferometer branches i, ii by a polarizing splitter 100, the branches equipped with interferometers I, II respectively. For the invention it is not important how the interferometer design in the branches is realized as long an optical path difference is created for two interfering beam components by a retarder design that comprises multiple birefringent media having mutually different birefringency and each having optical axes that are not aligned with the polarized beam in order to create polarized beam components traveling along the respective optical axes of the birefringent media having a total path difference; said multiple birefringent media arranged with the optical axes relative to each other so that at least one increases an optical path difference and at least one decreases said optical path difference between the polarized beam components to minimize a focal shift between the polarized beam components, to be further explained in the subsequent. Here an interferometer is shown where the polarized beam components are recombined by polarizing beam splitter 200. Furthermore, in the detector design, it is convenient to have the image sensors coplanar with the exit ports but this is not essential; indeed, further relay optics, including mirrors or the like may be present to image the interferometer image of recombined polarized beam components, e.g. on a single planar sensor surface.

A similar arrangement may take place in the other branch II of the detector. The beam B enters the detector system D via an aperture in telescope T, and is imaged by relay optics; schematically indicated with a lenses 40 and 60 arranged to imaging the area of interest (in particular; of the earth surface) on the detectors, 251, 252, 351, 352. Lens 40 collimates incoming light coming from a field stop arranged in the telescope; and is collimated onto polarizing beam splitter 100 (PBS1). The polarizing beam splitter 100 splits the light into two paths of mutually orthogonal polarizations; in each path a retarder R is provided having an optical axis at 45 degree angle with the polarization direction, as an example.

This way of operation makes that all light is being used. One of the output beams is s- and the other is p-polarized. Due to the birefringence properties of the retarder an optical path difference is created between the E (extraordinary) and O (ordinary) polarized components of the light. In the branches iii, interferometers I, and II are arranged to render interference images between the E and the O components having respective phase differences due to the optical path difference in the respective interferometers.

In total, in this arrangement, two images may be obtained on the detectors with phase steps δ equal to 0°, and 180°. From these images the relative intensity can be obtained for on- and off peaks of the absorption spectrum, which is a direct measure for the concentration of the gas being measured.

The largest field of view may be directed in the flight direction to enable the binning of as many pixels to create the largest Signal to Noise Ratio (SNR).

Polarizing beam splitter 200 combines said polarization components at exit ports to produce phase stepped images at different phases on detectors 251, 252, 351, 352. The retarder R creates a phase difference between two orthogonally polarisation components that is wavelength dependent.

Figure 3:
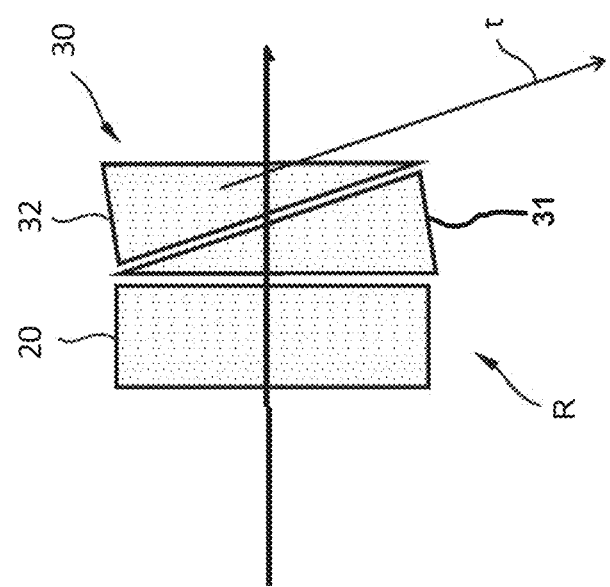
FIG. 3 provides a detailed design with ray paths of a retarder according to the invention.

In FIG. 3 retarder R is shown in more detail that is inserted in order to create a phase difference. The retarder R comprises multiple birefringent media 20, 30 of differing refractive indices of mutually different materials. Preferably first media, e.g. medium 20 have a high retardance, that is, the difference between refractive indices of the ordinary axis and the extraordinary axis (causing the birefringence) is relatively large, e.g. larger than 0.2 or even larger than 0.3 (ne-no ~0.2-0.3); wherein second media, e.g. medium 30 has a lower retardance, of about 0.01, e.g. lower than 0.1 (ne-no ~0.009). First media may be formed from e.g. TiO2 (Rutile) or Calcite where second media may be formed by MgF2 or Quartz. While the media 20, 30 can have different alignments and orders in the beam paths of polarized beams iii; at least some of the media has an optical axes that is not aligned with polarized beams i; ii (see FIG. 2); in order to create polarized beam components traveling along the respective optical axes (i.e. the extraordinary and ordinary axes) of the birefringent media having a total path difference. While it is known that birefringent materials can be used to create an OPD without splitting the beams into two separate paths; a drawback of birefringent materials is that the amount of birefringence is limited, thus requiring relatively thick pieces of material to arrive at a desired OPD value.

Having an OPD in an interferometer will in general result in different locations of the focal planes, pertaining to the two interferometer arms. This effect is indicated as angular dependence of the interferometer.

Where in a normal interferometer the angular dependence can be reduced by either implementing two glass plates, one in each interferometer arm, or by one glass plate in one arm, and an adjustment in air space in the other arm, this is not an option for a birefringent OPD. According to the inventive embodiment, in the retarder R multiple birefringent media 20, 30 are arranged with the optical axes relative to each other so that at least one increases an optical path difference and at least one decreases said optical path difference between the polarized beam components to minimize a focal shift between the polarized beam components so that the interference images are lying in a single focal plane.

Accordingly, angular independence can be obtained using multiple birefringent media of different materials 20, 30. By tuning the two thicknesses the required OPD can be set while still having overlapping focal planes for the two interfering components.

In the shown example TiO2 (medium 20) and Quartz (medium 30) are used as birefringent materials. In this case TiO2 (medium 20) thickness is set to create an OPD that is slightly larger than the required OPD. The Quartz thickness (medium 30) may be adjustable. In particular, The detector system according to any preceding claim, wherein at least one of the birefringent media is shaped in a wedge shape, that can be translated laterally to a central optical axis of the beam direction to increase or decrease the optical path difference.

In the example, birefringent medium 30 is provided as plane plate split into two wedges having an equal apex angle so that by shifting one wedge with respect to the other wedge; along a direction t coplanar to opposing wedges 31, 32 (in direction t as shown in FIG. 3) a negative OPD value is produced while keeping the beam path essentially parallel and introducing no angular dependence. The thickness of medium 30 may be adjusted until the sum of the OPD values of the birefringent blocks equals a required OPD value.

The focal shift due to a birefringent plan plate is equal to $$\frac{L}{n_E} - \frac{L}{n_O}$$

and the OPD is found via $$|L(n_B - n_O)|$$

where L is the thickness of the birefringent crystal, and $n_E$ and $n_O$ are the extra ordinary and ordinary refractive index, respectively. In particular, such an optical path difference corresponds to the multiple birefringent media 20, 30 tuned in thickness to provide an optical path difference for a central wavelength of interest and a peak to peak distance in an absorption spectrum.

By writing this down for two crystals and requiring that the total focal shift should be zero and total OPD should be the required OPD the thicknesses for a angular independent higher order retarder are found.

As an example:

For an OPD of 0.347 mm a 2.095 mm thick plan plate of $TiO_2$ and a 23.656 mm thick plan plate of Quartz is required. The thickness of 23.656 mm is large enough to split the plan plate into two wedges with equal apex angle, thus creating the possibility to fine tune the OPD value and align the fringes with the absorption features.

In preceding embodiment the discussion is limited to the functional elements, i.e. most of the powered optics used for imaging has been left out. Practical embodiments may therefor be enhanced by functional features represented by optical elements have the same functional effects.

The invention claimed is:

1. A detector system for spatially resolved detection of a gas substance in an area, the detector system comprising:
    a telescope providing an optical beam corresponding to the area;
    at least one detector comprising an image sensor;
    a band filter arranged in a beam path of the optical beam before the at least one detector, the band filter being arranged for transferring a wavelength spectrum of interest of the optical beam including an absorption wavelength corresponding to the gas substance;
    a polarizing beam splitter; and
    at least one interferometric stage, wherein each interferometric stage of the at least one interferometric stage comprises a retarder for creating an optical path difference for measuring absorption dips due to presence of a gas of interest in the area,
    wherein the telescope is arranged to image the area onto the at least one detector,
    wherein the polarizing beam splitter is arranged to produce polarized beams, of the optical beam, of mutual orthogonal polarization in respective branches, wherein each respective branch comprises a mutually orthogonally polarized one of the polarized beams; wherein the at least one detector is provided in at least one of the respective branches, and
    wherein the at least one interferometric stage is arranged for receiving one of the polarized beams to produce an interferometric image on the at least one detector;
    wherein the retarder comprises multiple birefringent media having mutually different birefringency, and
    wherein each one of the multiple birefringent media has an optical axis that is not aligned with a received one of the polarized beams in order to create polarized beam components traveling along the respective optical axes of the birefringent media having the optical path difference,
    wherein the multiple birefringent media are arranged with optical axes relative to each other so that:
        at least one increases an optical path difference between the polarized beam components, and
        at least one decreases the optical path difference between the polarized beam components;
    wherein thicknesses of the multiple birefringent media are tuned to minimize a focal shift between the polarized beam components.

2. The detector system according to claim 1, wherein at least one of the birefringent media is shaped in a wedge shape, that can be translated laterally to a central optical axis of the beam direction to increase or decrease the optical path difference between the polarized beam components.

3. The detector according to claim 2, wherein the birefringent media comprises a first medium and a second medium,
    wherein the second medium is provided as a plane plate split into two wedges having an equal apex angle.

4. The detector system according to claim 1, wherein one of the birefringent media comprises Rutile or Calcite and the other comprises MgF2 or Quartz.

5. The detector system according to claim 1, wherein the interferometric stage comprises a further polarizing beam splitter that combines the polarized beam components at exit ports to produce phase stepped images.

6. The detector system according to claim 1, wherein the telescope is arranged to facilitate imaging the area in each branch of the polarizing beam splitter; and wherein each interferometric stage comprises corresponding detectors to image stepped phase images.

7. The system of claim 1, wherein the optical path difference between the polarized beam components is set in a range of 0.01 mm to 0.8 mm.

8. The system of claim 1, wherein the telescope is of a telecentric type.

* * * * *